United States Patent [19]
Gilboa et al.

[11] Patent Number: 5,473,611
[45] Date of Patent: Dec. 5, 1995

[54] APPARATUS AND METHOD FOR LIMITING JITTER CAUSED BY POINTER MOVEMENT WHILE MAPPING ONE TELECOMMUNICATIONS SIGNAL INTO ANOTHER SUCH SIGNAL

[75] Inventors: Paz Gilboa, Herzeliya, Israel; Tat K. Ng, Derby, Conn.

[73] Assignees: TranSwitch Corporation, Shelton, Conn.; ECI Telecom, Israel

[21] Appl. No.: 253,382

[22] Filed: Jun. 3, 1994

[51] Int. Cl.$^6$ .................................................... H04J 3/07
[52] U.S. Cl. .................. 370/102; 370/105.3; 370/110.1; 375/118
[58] Field of Search ............................... 370/110.1, 102, 370/100.1, 105.3, 84; 375/118

[56] References Cited

U.S. PATENT DOCUMENTS

| | | | |
|---|---|---|---|
| 5,210,745 | 5/1993 | Guinand et al. | 370/79 |
| 5,287,360 | 2/1994 | Regent | 370/79 |
| 5,331,641 | 7/1994 | Parruck et al. | 370/102 |
| 5,343,476 | 8/1994 | Urbansky | 370/108 |

OTHER PUBLICATIONS

SONET: Now It's the Standard Optical Network, IEEE Communications Magazine, Mar. 1989, pp. 8–13.

*Primary Examiner*—Douglas W. Olms
*Assistant Examiner*—Seema S. Rao
*Attorney, Agent, or Firm*—David P. Gordon

[57] ABSTRACT

Jitter is limited in the mapping of a first telecommunications signal into a second telecommunications signal, by, upon receiving an indication that the payload pointer of the second telecommunications signal is moving in a first direction, generating a compensative payload pointer movement of the first telecommunications signal in a second direction which is opposite the first direction. The invention has particular application to the mapping of three E3 telecommunications signals which are in the format of a TUG-3 signal into an STS-3C SONET telecommunications signal in the STM-1 VC-4 format. When the STS-3C signal requires a pointer movement due to frequency compensation in the system, a compensative pointer movement at the TUG-3 level avoids eight units of jitter in the TUG-3 signal which could adversely affect system performance.

7 Claims, 5 Drawing Sheets

POH = PATH OVERHEAD BYTE

▨ : STS-Nc PAYLOAD CAPACITY

⊠ : UNDEFINED OVERHEAD BYTE (ALL-ZEROS PATTERN AS AN OBJECTIVE)

* : CONCATENATION INDICATION
  H1*(10010011)
  H2*(11111111)

APPARATUS AND METHOD FOR LIMITING JITTER CAUSED BY POINTER MOVEMENT WHILE MAPPING ONE TELECOMMUNICATIONS SIGNAL INTO ANOTHER SUCH SIGNAL

BACKGROUND OF THE INVENTION

1. Field of the Invention

This invention generally relates to telecommunications signals. More particularly, this invention relates to apparatus and methods for limiting jitter in a first telecommunications signal which can be caused by pointer movement in a second telecommunications signal into which the first telecommunications signal is being mapped. The invention finds specific application in the limiting of jitter in a TUG-3 signal caused by a pointer movement in a SONET STM-1 (STS-3) signal, although it is not limited thereto.

2. State of the Art

The telecommunications network servicing the U.S. and the rest of the world is presently evolving from analog transmission to digital transmission with ever-increasing bandwdith requirements. Fiber optic cable has proved to be a valuable tool of such evolution, replacing copper cable in nearly every application from large trunks to subscriber distribution plants. Fiber optic cable is capable of carrying much more information than copper cable and with lower attenuation.

While fiber optic cable represents the future in telecommunications, presently there remains an entire telecommunications network comprised of various cable types, served by equipment of different vintages, and run according to various coexisting transmission standards. While older standards, cables, and equipment will be eventually phased out, for the time being, it is necessary that all the old and new standards, equipment, and transmission lines be as compatible as possible. Often, such compatibility requires the mapping and multiplexing of a plurality of lower speed signals into higher speed signals and vice versa. Such a mapping with concurrent multiplexing and demultiplexing is common in commonly found add/drop equipment.

When mapping one signal into another signal, it is desirable to limit signal jitter, both because it is advantageous to limit the amount of buffer memory and resultant delay which results from large buffers, and because the standards of various telecommunications signals do not permit large amounts of jitter. In telecommunications signals subject to the SONET standards, jitter can be caused by pointer movements (e.g., pointer increments (INC) and decrements (DEC)) which cause byte stuffing and destuffing. Stuffing (INC) and destuffing (DEC) are legitimate mechanisms which compensate for frequency offset between two signals. When stuffing or destuffing occurs, the SONET payload bytes move relative to the overhead bytes. In order to accommodate stuffing (INC) or destuffing (DEC) in the SONET signal, the telecommunications signals which are being mapped into the SONET signal must either provide additional data (in the case of destuffing in the SONET signal) than would otherwise be provided, or hold data back (in the case of stuffing in the SONET signal) which would otherwise be provided. The provision of additional data, or the holding back of data, however, must be assimilated by the signal being mapped into the SONET signal, e.g., through bit stuffing or destuffing. This assimilation, however, can cause substantial jitter in the signal being mapped, and cause it to fail jitter performance requirements.

SUMMARY OF THE INVENTION

It is therefore an object of the invention to provide a mechanism to limit the jitter of a first telecommunications signal which is being mapped into a second telecommunications signal when the second telecommunications signal requires a pointer increment (byte stuff) or decrement (byte destuff).

It is another object of the invention to utilize pointer movements in a first telecommunications signal which is being mapped into a second telecommunications signal in order to limit jitter in the first telecommunications signal when the second telecommunications signal requires a pointer increment or decrement.

It is a further object of the invention to limit jitter in TUG-3 telecommunications signals which are being mapped into a SONET STS-3C signal by causing the pointers of the TUG-3 signal to move in the opposite direction of the pointer movement in the STS-3C signal.

In accord with the objects of the invention, the method invention generally comprises limiting jitter in the mapping of a first telecommunications signal which is being mapped into a second telecommunications signal, by, upon receiving an indication that the payload pointer of the second telecommunications signal is moving in a first direction, generating a compensative payload pointer movement of the first telecommunications signal in a second direction which is opposite the first direction. The method invention has particular application to the mapping of three E3 telecommunications signals which are in the format of a TUG-3 signal into an STS-3C SONET telecommunications signal in the STM-1 VC-4 format. When the STS-3C signal requires a pointer movement due to frequency compensation in the system, a compensative pointer movement at the TUG-3 level avoids up to eight units of jitter in the TUG-3 signals which could adversely affect system performance.

Apparatus for implementing the methods of the invention are related directly to the methods.

Additional objects and advantages of the invention will become apparent to those skilled in the art upon reference to the detailed description taken in conjunction with the provided figures.

BRIEF DESCRIPTION OF THE DRAWINGS

FIGS. 3a–3c are diagrams showing movement of the TUG-3 transport overhead relative to the TUG-3 POH which results from the STS-3C pointer movement and then the TUG-3 compensating pointer movements.

DETAILED DESCRIPTION OF THE PREFERRED EMBODIMENT

Before turning to detailed aspects of the mechanisms for limiting jitter in a first telecommunications signal which is being mapped into a second telecommunications signal, an overview of the terminology and the format of the telecommunications signals is helpful. It should be appreciated that while the invention is being described with reference to two particular telecommunications signals (TUG-3 and STS-3C), the invention has application to other telecommunications signals which effect pointer movements, stuffs, and destuffs.

Figure 1:
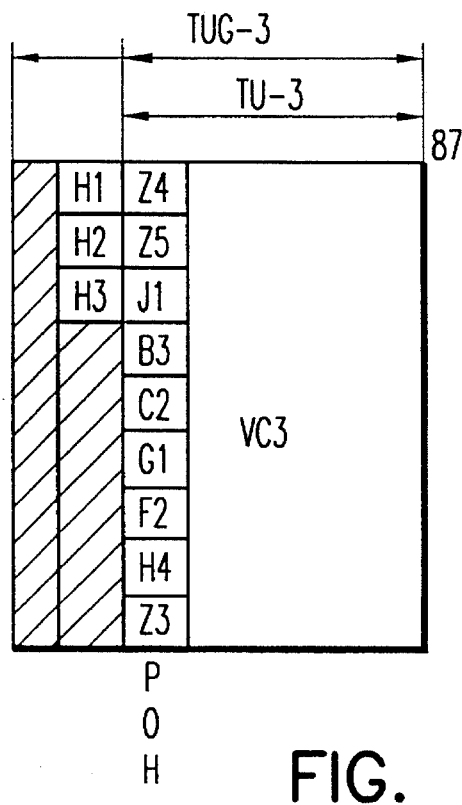
FIG. 1 is a diagram of the frame format of a TUG-3 signal.

FIG. 1 is a diagram of the frame format of a TUG-3 signal. The TUG-3 signal of FIG. 1 has several components: a VC-3 payload; a path overhead (POH); a transport overhead (TOH); and an undefined portion which is shown as crosshatched. The VC-3 payload is typically generated from an E3 stream of data. The VC-3 payload in conjunction with the path overhead (POH) is said to form a TU-3 signal. The transport overhead includes at least three bytes: H1, H2, and H3. Bytes H1 and H2 together constitute a pointer which points to the start of the payload; i.e., to the J1 byte of the POH. Byte H3 is a "byte destuff" opportunity; i.e., one byte actual payload data may be inserted into byte H3 if necessary. The undefined portion of the TUG-3 signal is provided for purposes of mapping the TUG-3 signal into a telecommunications signal formatted in the SONET format, as discussed below. In particular, if the TUG-3 is to be mapped into the payload of an STS-1 type signal, eighty-seven columns of data are required. Since the typical TUG-3 has only eighty-six columns of data, and the first section of data having the transport overhead only has three bytes of data as opposed to nine bytes of data, one complete "undefined" column and one partial undefined column are required for a proper mapping. Similarly, if the TUG-3 is to be mapped into a portion (e.g., one-third) of the payload of an STS-3C type signal, the TUG-3 similarly needs the eighty-seven columns of data. Hence, the complete and partial undefined columns must be provided. For purposes herein, the first undefined column of the TUG-3 signal will be designated "OH1", while the transport overhead (H1, H2, H3), in conjunction with the partial undefined column will be designated "OH2". For purposes of mapping the TUG-3 into an STS-3C type signal, both of these columns will be said to comprise the transport overhead for the TUG-3 signal.

Figure 1A:
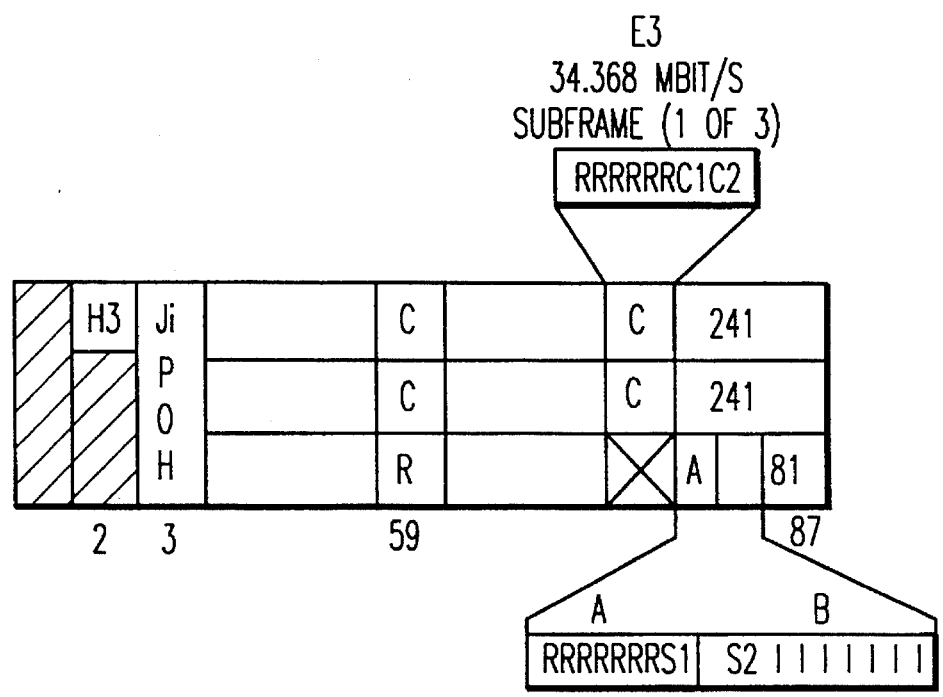
FIG. 1a is a breakout of a portion of FIG. 1 showing bit stuff and bit destuff opportunities in a TUG-3 signal.

Three of the nine rows of the TUG-3 signal of FIG. 1 are seen in FIG. 1a and merit closer analysis. The byte located directly after the H3 byte destuff opportunity represents a "byte stuff" opportunity; i.e., one byte of "stuff" which is not data may take the place of actual data. While in FIG. 1a, the byte after the H3 byte is shown as J1, those skilled in the art will recognize that the TUG-3 payload can slide relative to the TUG-3 frame, and thus the J1 byte will not always follow the H3 byte. In addition to the byte stuff opportunity, two bytes (A, B) with a bit stuff and bit destuff opportunity are provided. Control of bit stuffing or destuffing is exercised by the five stuff/destuff control bytes (C). As shown in the breakout of one of the control bytes, each of the control bytes includes six unused bits (R), and two control bits (C1, C2). As shown in the breakout of bytes A and B, byte A includes seven undefined bits and a destuff bit opportunity (S1), while byte B includes seven bits of data (I) and a stuff bit opportunity (S2). When no bit stuff or destuff is required, the control bytes each set the control bit C1 to a value 0 and the control bit C2 to a value 1. As a result, bit S1 of byte A is caused to be set as an unused bit, while bit S2 is set as a data bit of information. If a bit stuff is desired, the control bits C2 are set to zero so that bit S2 is set as an unused bit; while if a bit destuff is desired, the control bits C1 are set to a value one so that bit S1 is set as a data bit of information. It will be appreciated by those skilled in the art, that in previous TUG-3 applications, it is typically the destuff and stuff bits S1 and S2 which have been utilized for synchronization purposes as opposed to the H3 byte and the byte following H3 which introduce eight bits or units of movement at a time.

Figure 2:
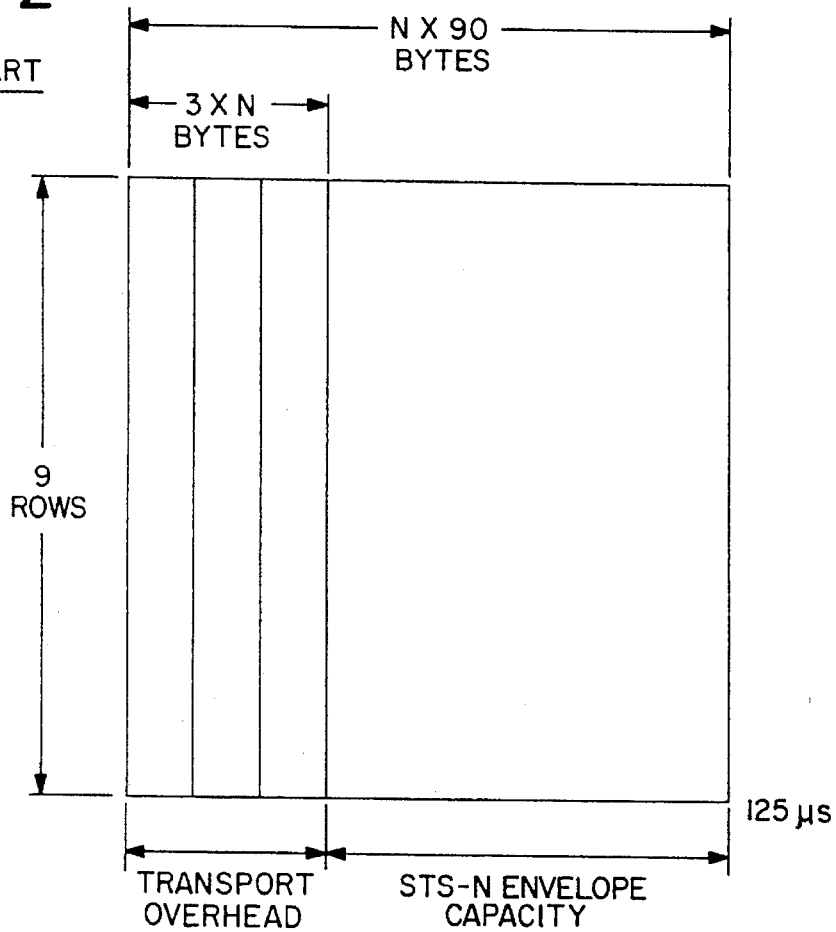
FIG. 2 is a diagram of the frame format of an STS-3C signal.

Before turning to FIG. 2, it should be noted that the three rows of FIG. 1a are substantially repeated three times in the TUG-3 frame, except that the POH bytes change. Thus, in each TUG-3 frame, there are three bit destuff (S1) and three bit stuff (S2) opportunities with associated controls.

Figure 2B:
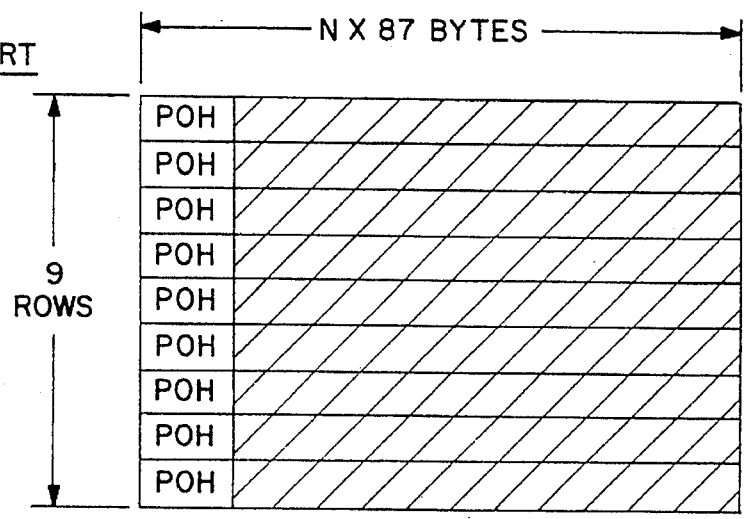
FIGS. 2a and 2b are breakouts of portions of FIG. 2 and show the transport overhead, the path overhead, and the data payload of the STS-3C signal of FIG. 2.
Figure 2A:
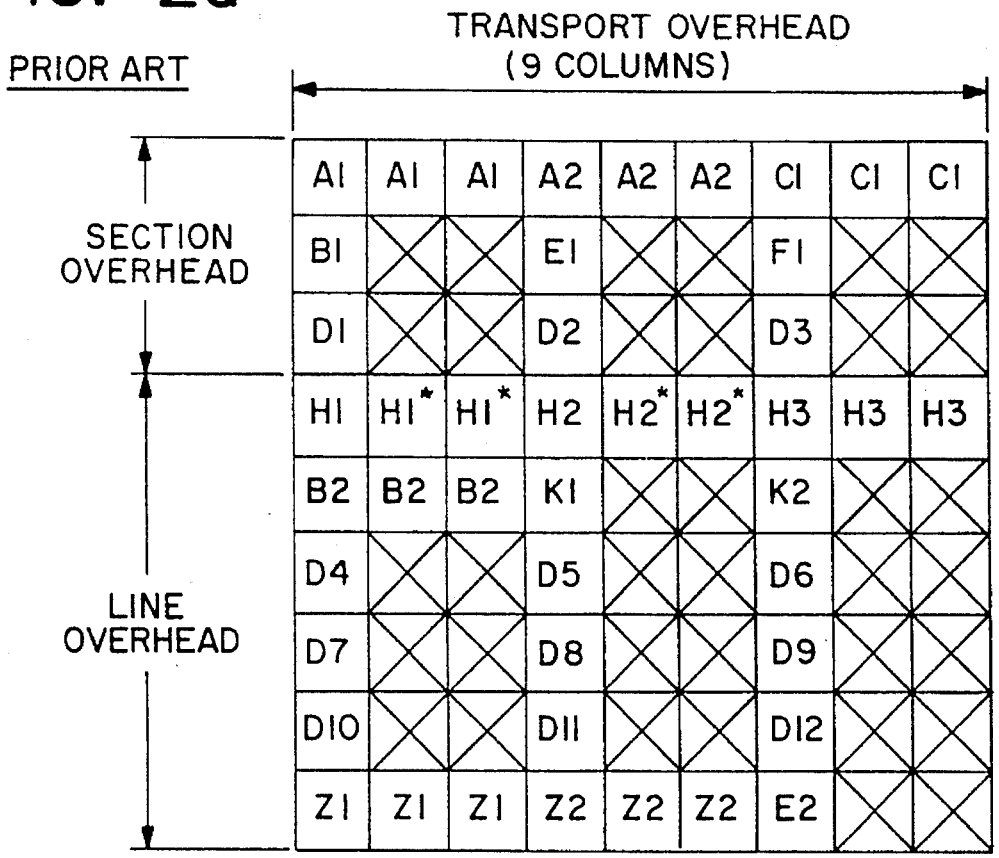

Turning to FIG. 2, a diagram of the frame format of an STS-3C signal is seen. The STS-3C signal includes 270 columns, with the first nine columns being reserved for the transport overhead. As seen in FIG. 2a, many bytes of the transport overhead are defined, although some are left undefined. In addition, as seen in FIG. 2b, the payload of the STS-3C signal is shown to include three bytes of path overhead (POH), and an additional two hundred fifty-eight bytes of data payload. As is known to those skilled in the arts, the POH bytes do not have to take the position shown in FIG. 2b, as the POH bytes, as well as the data payload, slide relative to the STS-3C frame.

In a typical add/drop situation, it may be desirable to multiplex a TUG-3 signal such as is seen in FIG. 1 into a portion (e.g., one-third) of an STS-3C signal such as is seen in FIG. 2. In such a situation, when the STS-3C signal generates a pointer movement which requires a byte stuff or byte destuff, the TUG-3 signal must immediately provide the stuff or data required. The immediate provision of stuff or data will typically cause the TUG-3 signal to experience jitter, as the amount of buffered data awaiting mapping into the STS-3C will increase by eight bits if stuff was provided instead of data, or will decrease by eight if data (destuff) was provided instead of stuff. The bit stuffing or destuffing mechanisms (S1 and S2) can then be used over time to increase or decrease the amount of buffered data awaiting mapping to the ideal amount so as to prevent underflow or overflow of data. However, such a corrective bit stuffing or destuffing mechanism could take numerous frames to accomplish, as due to standards requirements, a bit stuffing or destuffing is only permitted once every so many frames in order to maintain the jitter performance.

In accord with a first aspect of the invention, in order to eliminate the problems introduced into the TUG-3 signal as a result of a stuff or destuff requirement in the STS-3C signal, upon a pointer movement associated with the stuff or destuff in the STS-3C signal, the TUG-3 signal generates a compensative payload pointer movement in the opposite direction of the pointer movement in the STS-3C signal. For example, if the STS-3C signal requires a destuff (i.e., additional data), the TUG-3 signal must immediately provide that data for the H3 byte of the STS-3C signal. Upon providing extra data, the amount of buffered data for the TUG-3 signal would typically decrease by one byte. In order to increase the amount of data in the data buffer back to the ideal level, a stuff signal is generated in the TUG-3 signal. As a result of the stuff signal, at the byte after the H3 byte of the TUG-3 signal, stuff will be inserted into the TUG-3 data stream. When the stuff is sent to the STS-3C signal in lieu of actual data, the amount of buffered data for the TUG-3 signal will increase by one byte back to the ideal level.

The apparatus for implementing the compensative payload pointer movement is seen and will be discussed below with reference to FIG. 4.

Figures 3A, 3B, 3C:
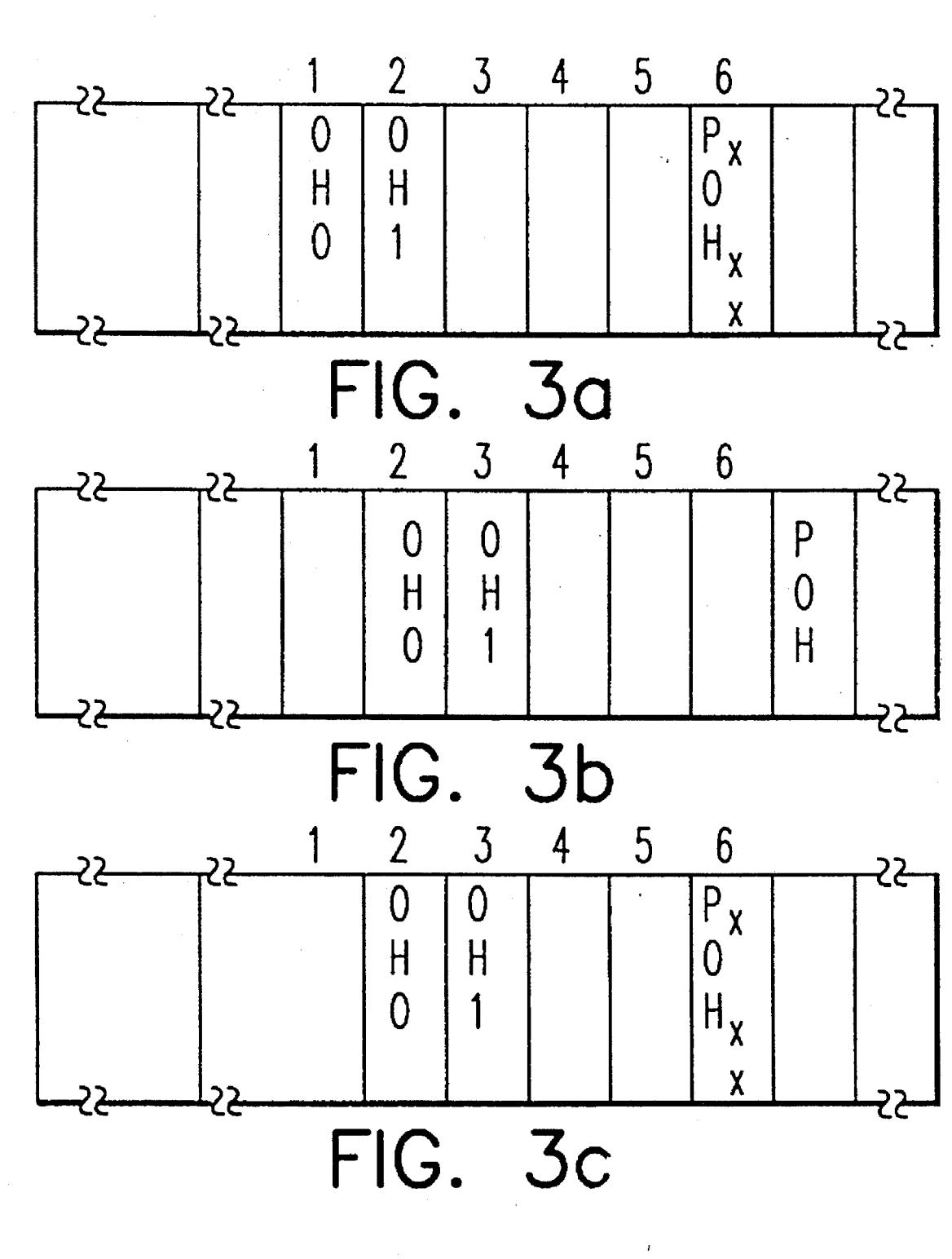

FIGS. 3a–3c are diagrams which show movement of the

TUG-3 transport overhead relative to the TUG-3 POH which results from the STS-3C pointer movement and additional movement resulting from the TUG-3 compensating pointer movements. In FIGS. 3a–3c, the stuff and transport overhead of the TUG-3 signal are shown as columns OH0 and OH1, while the TUG-3 path overhead is shown as POH. As seen in the hypothetical starting point FIG. 3a, the POH of the TUG-3 signal is several columns away from the TUG-3 transport overhead. It will be appreciated that a stuff requirement in the STS-3C signal will cause the bytes of the STS-3C payload envelope of the STS-3C signal to move towards the right as shown in FIG. 3b. A compensating destuff in the TUG-3 signal, however, causes the POH of the TUG-3 signal to move to the left relative to the TOH of the TUG-3 signal as seen in FIG. 3c. Effectively, then, a stuff or destuff requirement in the STS-3C signal which is followed by a corrective pointer movement in the TUG-3 signal causes the TOH of the TUG-3 signal to move, while the POH of the TUG-3 signal moves with the TOH and then moves back to its original location.

Figure 4:
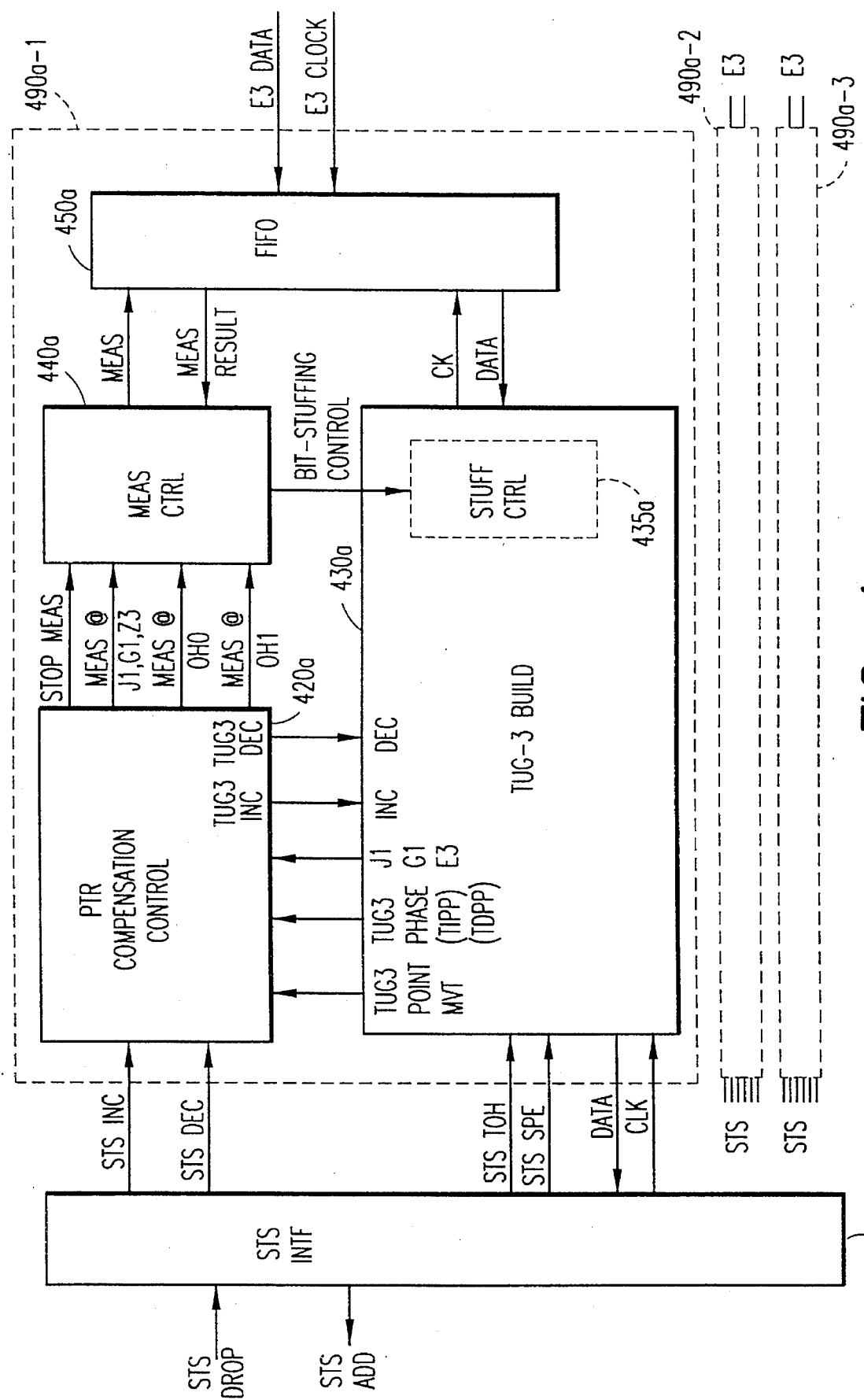
FIG. 4 is a block diagram of the apparatus implementing the methods of generating a compensative payload pointer movement in the TUG-3 signal when the STS-3C signal generates a pointer movement.

The apparatus implementing the method of the invention is seen in FIG. 4, and generally comprises a STS interface block 410, a pointer compensation control block 420, a TUG3 build block 430, a FIFO measurement control block 440, and a FIFO 450. It will be appreciated that all blocks shown in FIG. 4 may be implemented on one or more integrated circuits. It will also be appreciated that for a single STS interface block 410, three sets of pointer compensation control blocks 420, TUG3 build blocks 430, FIFO measurement control blocks 440, and FIFOs 450 are utilized (indicated as 490a, 490b, 490c), as three TUG-3 signals are required to build a STS-3C signal.

On a very basic level, the method of generating a compensative payload pointer movement is carried out using the STS interface block 410, the pointer compensation control block 420 and the TUG-3 build block 430 of FIG. 4. In particular, the STS interface block 410 interfaces with the SONET signal. Among other things, the STS interface block 410 monitors the H1 and H2 bytes of the SONET signal and determines when the pointer has been incremented or decremented in order to generate a stuff or destuff. Upon detection of a pointer movement, the STS interface block 410 appropriate generates and provides the pointer compensation control block 420 with either an increment (STS INC) signal or a decrement (STS DEC) signal. The pointer compensation control 420 then generates and provides to the TUG3 build block 430 a TUG-3 decrement (TUG3 DEC) signal in response to the incoming STS INC signal, and a TUG-3 increment (TUG3 INC) signal in response to the incoming STS DEC signal. As will be appreciated by those skilled in the art, the TUG3 build block 430 uses the TUG3 INC or TUG3 DEC control signals in building the TUG-3 signal and adding it to the SONET signal via the STS interface 410.

It should be noted that the measurement control block 440 is used to measure the amount of data in the FIFO 450 for purposes of determining whether data is accumulating too quickly or not quickly enough in the FIFO (i.e., overflow, or underflow conditions). As a result of the FIFO "depth" measurement which is typically conducted at the J1, G1, and E3 byte locations of the TUG-3 signal, the measurement control 440 block can generate a bit stuff or destuff control signal which is provided to the stuff control block 435 of the TUG3 build block 430.

It will be appreciated that the various other signals are passed between the blocks shown in FIG. 4. For example, the TUG3 build block 430 is preferably provided with indications of the STS phase via the STS TOH and STS SPE signals provided by the STS interface block 410.

There have been illustrated and described herein apparatus and methods for limiting the jitter of a first telecommunications signal which is being mapped into a second telecommunications signal which results from a pointer movement in the second telecommunications signal. While particular embodiments of the invention have been described, it is not intended that the invention be limited thereto, as it is intended that the invention be as broad in scope as the art will allow and that the specification be read likewise. Thus, while the invention was described with particular reference to STS-3C and TUG-3 type signals, it will be appreciated that the invention also applies to other telecommunications signals which have stuff and destuff opportunities and where the payload envelope of the signal can slide relative to the transport overhead of the signal. Also, while block diagrams were provided for implementing the method of generating a compensating pointer, it will be appreciated that other means could be utilized to implement the method. It will therefore be appreciated by those skilled in the art that yet other modifications could be made to the provided invention without deviating from its spirit and scope as so claimed.

We claim:

1. A method of limiting jitter in a first telecommunications signal having a first frame which is being mapped into a second telecommunications signal having a second frame, said first telecommunications signal having a first payload envelope and a first overhead, said first overhead including a first pointer which points to the location of the start of said first payload envelope wherein a value of said first pointer changes in conjunction with a stuff or destuff in said first telecommunications signal, and said second telecommunications signal having a second payload envelope and a second overhead, said second overhead including a second pointer which points to the location of the start of said second payload envelop wherein a value of said second pointer changes in conjunction with a stuff or destuff in said second telecommunications signal, said method comprising:

determining that said value of said second pointer of said second telecommunications signal is incrementing or decrementing; and in response to determining, causing said first pointer of said first telecommunications signal to decrement in value when said second pointer is incrementing in value and to increment in value when said second pointer is decrementing in value.

2. A method according to claim 1, wherein:

said first pointer is incremented in value after said second pointer is decremented in value, and said first pointer is decremented in value after said second pointer is incremented in value.

3. A method according to claim 1, wherein:

said first telecommunications signal is a TUG-3 signal, and said second telecommunications signal is a SONET STS-3C signal.

4. A method according to claim 1, wherein:

said first telecommunication signal includes H1 and H2 bytes, and said first pointer is comprised of said H1 and H2 bytes of said first telecommunications signal, and said second telecommunication signal includes H1 and H2 bytes, and said second pointer is comprised of said H1 and H2 bytes of said second telecommunications signal.

5. An apparatus for mapping a first telecommunications signal having a first frame into a second telecommunications signal having a second frame, said first telecommunications signal having a first payload envelope and a first overhead, said first overhead including a first pointer which points to the location of the start of the said first payload envelope, and said second telecommunications signal having a second payload envelope and a second overhead, said second overhead including a second pointer which points to the location of the start of said second payload envelop wherein a value of said second pointer changes in conjunction with a stuff or destuff in said second telecommunications signal, said apparatus comprising:

a) second pointer movement detection means for receiving said second telecommunications signal and detecting that said second pointer has incremented or decremented in value, and b) first pointer movement means for decrementing a value of said first pointer in response to detecting that said second pointer has incremented in value, and for incrementing the value of said first pointer in response to detecting that said second pointer has decremented in value, wherein incrementing and decrementing of the value of said first pointer effects stuffing and destuffing in said first telecommunications signal.

6. An apparatus according to claim 5, wherein:

said first pointer movement means changes a value of at least one of H1 and H2 pointer bytes in said first telecommunications signal.

7. An apparatus according to claim 5, wherein:

said first telecommunications signal is a TUG-3 signal, and said second telecommunications signal is a SONET STS-3C signal.

* * * * *